United States Patent
Szubbocsev (10) Patent No.: US 11,727,127 B2
(45) Date of Patent: Aug. 15, 2023

(54) SECURE STORAGE DEVICE VERIFICATION WITH MULTIPLE COMPUTING DEVICES

(71) Applicant: Micron Technology, Inc., Boise, ID (US)

(72) Inventor: Zoltan Szubbocsev, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 371 days.

(21) Appl. No.: 17/072,541

(22) Filed: Oct. 16, 2020

(65) Prior Publication Data

US 2022/0121756 A1  Apr. 21, 2022

(51) Int. Cl.
G06F 21/00 (2013.01)
G06F 21/60 (2013.01)
H04L 9/14 (2006.01)
H04L 9/30 (2006.01)

(52) U.S. Cl.
CPC .............. G06F 21/602 (2013.01); H04L 9/14 (2013.01); H04L 9/3073 (2013.01)

(58) Field of Classification Search
CPC ........ G06F 21/602; G06F 21/78; G06F 21/44; H04L 9/14; H04L 9/3073; H04L 9/083; H04L 9/0894
See application file for complete search history.

(56) References Cited

U.S. PATENT DOCUMENTS

| | | | | |
|---|---|---|---|---|
| 7,657,034 B2* | 2/2010 | Volp | ...................... | H04L 9/0894 380/37 |
| 10,411,894 B1* | 9/2019 | Yavnilovich | .......... | H04W 12/06 |
| 2002/0157011 A1* | 10/2002 | Thomas, III | .......... | G06F 21/445 713/193 |
| 2007/0067244 A1* | 3/2007 | Jin | ........................ | H04L 9/3268 705/59 |
| 2011/0235806 A1* | 9/2011 | Fukuda | .................. | H04L 9/0841 380/282 |
| 2012/0063594 A1* | 3/2012 | Spalka | .................. | H04L 9/0816 380/44 |
| 2016/0373257 A1* | 12/2016 | Adrangi | .................. | H04L 9/006 |
| 2017/0279602 A1* | 9/2017 | Pham | .................. | H04L 63/0442 |
| 2018/0019878 A1* | 1/2018 | Jiang | .................... | H04L 9/3247 |
| 2018/0152454 A1* | 5/2018 | Kwon | .................... | H04L 63/045 |

(Continued)

FOREIGN PATENT DOCUMENTS

| | | | | | |
|---|---|---|---|---|---|
| CN | 101322349 | A | * 12/2008 | ............. | G06F 21/34 |
| CN | 110543768 | A | * 12/2019 | ............. | G06F 21/44 |
| WO | WO-0072499 | A1 | * 11/2000 | ............. | B41J 13/103 |

*Primary Examiner* — John B King (74) *Attorney, Agent, or Firm* — Holland & Hart LLP (57) ABSTRACT

Methods, systems, and devices for secure storage device verification with multiple computing devices are described. A secure storage device may receive from a computing device a first command and a first public key of a first key pair associated with the computing device. The secure storage device may select a second key pair from a plurality of key pairs to associate with the computing device based on receiving the first command and the first public key. The secure storage device may also encrypt a second public key of the second key pair using the first public received from the computing device based on selecting the second key pair. The secure storage device may transmit to the computing device a message that includes the encrypted second public key.

22 Claims, 5 Drawing Sheets

(56) References Cited

U.S. PATENT DOCUMENTS

| | | | |
|---|---|---|---|
| 2018/0183590 A1* | 6/2018 | Kuo | H04L 9/0838 |
| 2018/0232266 A1* | 8/2018 | Ikeda | H04L 9/3226 |
| 2018/0234237 A1* | 8/2018 | Ye | H04L 9/0891 |
| 2018/0241571 A1* | 8/2018 | Lu | H04L 9/0894 |
| 2019/0020483 A1* | 1/2019 | Meng | H04L 63/0823 |
| 2020/0145219 A1* | 5/2020 | Sebastian | G06F 21/32 |
| 2020/0213137 A1* | 7/2020 | Zhang | H04L 9/14 |
| 2020/0266987 A1* | 8/2020 | Goodman | H04L 9/3234 |
| 2020/0351082 A1* | 11/2020 | Wan | H04L 9/083 |
| 2022/0255909 A1* | 8/2022 | Pan | H04L 63/0435 |

* cited by examiner

FIG. 5 ative system. In such examples, the secure
SECURE STORAGE DEVICE VERIFICATION WITH MULTIPLE COMPUTING DEVICES

FIELD OF TECHNOLOGY

The following relates generally to one or more systems for memory and more specifically to secure storage device verification with multiple computing devices.

BACKGROUND

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read, or sense, at least one stored state in the memory device. To store information, a component may write, or program, the state in the memory device.

Various types of memory devices and memory cells exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), self-selecting memory, chalcogenide memory technologies, and others. Memory cells may be volatile or non-volatile. Non-volatile memory, e.g., FeRAM, may maintain their stored logic state for extended periods of time even in the absence of an external power source. Volatile memory devices, e.g., DRAM, may lose their stored state when disconnected from an external power source.

DETAILED DESCRIPTION

Some systems may include several different devices, services, and processes. A single device may authenticate the different devices, services, and processes. For example, the single device may be a secure storage device that the remaining different devices, services, and processes utilize to perform their function. In some examples, the system may be an automotive system. In such examples, the secure storage device may be included in a central computing device that serves as the storage device for one or more electrical systems or subsystems of the system. Examples of the electrical systems or subsystems may include a power train control unit, a human-machine interface control unit, a door control unit, different types of engine control units, seat control unit, speed control unit, telematic control unit, transmission control unit, brake control unit, battery management control unit, or others, or a combination thereof. In some examples, a cryptographic key may be used to authenticate the different devices, services, and processes. In some cases, using the same cryptographic key for every device, service, or processes may lead to security vulnerabilities. For example, an unauthorized party or unauthorized device may access data or exploit the operations or functionality of the secure storage device by exploiting the single cryptographic key. In other examples, the exploitation of one device, service, or process of the system may compromise the overall security of the system.

Systems, techniques, and devices are described herein for a secure storage device to authenticate each device, service, or process in a system that includes the secure storage device using different cryptographic key pairs. For example, the secure storage device may generate a quantity of cryptographic key pairs using a physical unclonable function. When a device, service, or process, first communicates with the secure storage device, the secure storage device may select a cryptographic key pair from the generated key pairs to associate with the device, service, or process. The secure storage device may then utilize the selected key pair to secure future communications with the device, service, or process. The secure storage device may implement the same process until each device, service, or process of the system is associated with a unique cryptographic key pair. By authenticating each device, service, or process individually, the security vulnerability of the system may decrease. For example, an unauthorized party exploiting a device, service, or process may not comprise the system as a whole as each device, system, or process has an individual cryptographic key pair. Additionally, the increased quantity of cryptographic key pairs may decrease the likelihood of an unauthorized party exploiting the system.

Features of the disclosure are initially described in the context of systems and dies as described with reference to FIG. 1. Features of the disclosure are described in the context systems and flow diagrams as described with reference to FIGS. 2 and 3. These and other features of the disclosure are further illustrated by and described with reference to an apparatus diagram and flowcharts that relate to secure storage device verification with multiple computing devices as described with reference to FIGS. 4 and 5.

Figure 1:
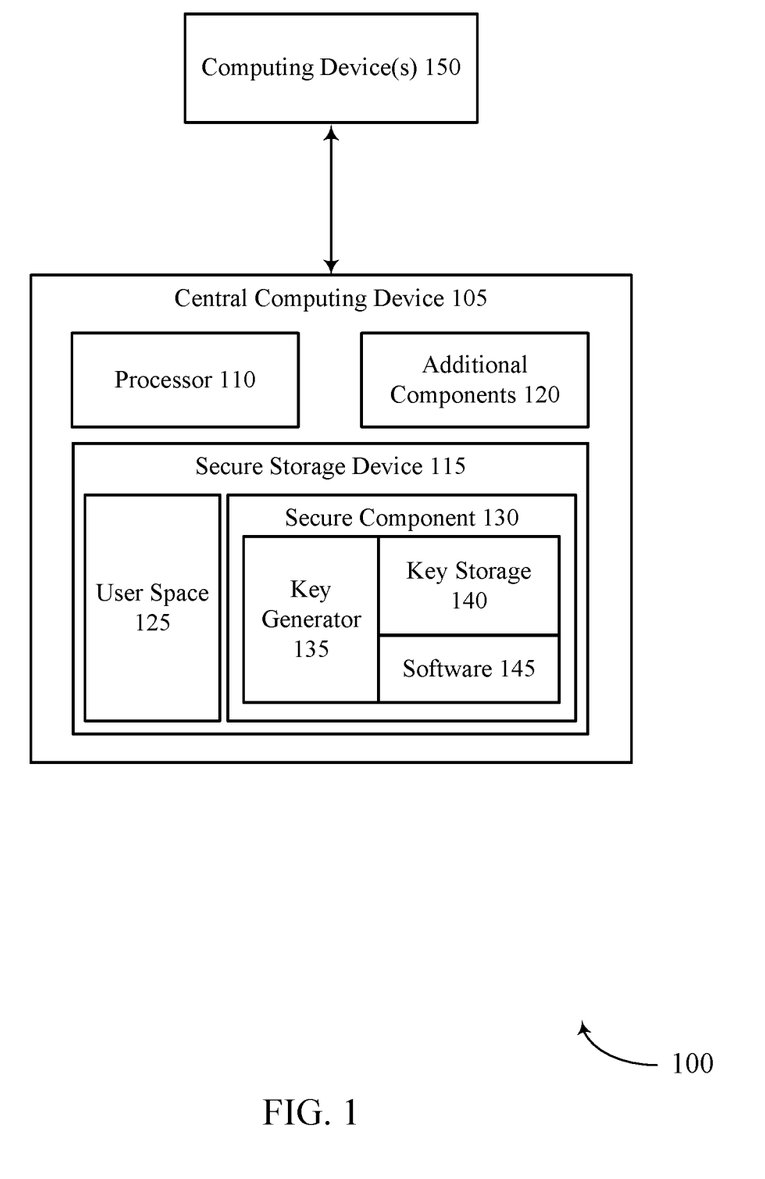
FIG. 1 illustrates an example of a system that supports secure storage device verification with multiple computing devices in accordance with examples as disclosed herein.

FIG. 1 illustrates an example of a system 100 that supports authenticating software images in accordance with examples as disclosed herein. The system 100 may include a central computing device 105 and one or more computing devices 150. The computing device(s) 150 may be an example of an infotainment system of a vehicle, a telematics system of a vehicle, a powertrain system of a vehicle, a speed control system of a vehicle, or the like.

The central computing device 105 may include a processor 110, a secure storage device 115, and one or more additional components 120. The secure storage device 115 may include user space 125 that is configured to store data (e.g., general purpose data). The storage device 115 may also include a secure component 130 that includes key generator 135, key storage 140, software 145. In some cases, the secure component 130 may store additional data or information securely.

The storage device 115 may generate one or more keys at key generator 135. In some examples, the key generator 135 may generate the one or more keys using a physical unclonable function. Additionally, the secure component 130 may store one or more of the generated keys by key generator 135 in the key storage 140, such as a management key and/or an identity key. The key may be an example of a symmetric server root key (SRK) or a set of two keys such as a management public key and a device-side identity private key. The server root key or management public key may allow an entity in possession of a copy of the SRK or the management private key to manage the secure component 130 by turning on or configuring security features of the secure component 130. The secure component 130 may also include software 145. The storage device 115 may include one or more components associated with a memory device that are operable to perform one or more authentication procedures as discussed herein.

The storage device 115 can be integrated into a central computing device 105, which may include a processor 110 interacting with the storage device 115. The processor 110 may communicate commands and information to and from the computing device(s) 150. The processor 110 may also communicate to the computing device 150 keys and messages during an authentication process. Prior to executing a command from computing device 150, the storage device 115 may authenticate the command to ensure that it has not been tampered with, and refrain from executing the command if its code has been modified by a malicious actor or an unauthorized party.

Techniques for authenticating information communicated to and from the computing device 150 to the central computing device 105 are described herein. For example, the secure storage device 115 may generate a quantity of key pairs (e.g., a predetermined quantity of key pairs). When the computing device(s) 150 communicate with the secure storage device 115, the secure storage device 115 may select a key pair from the generated key pairs to associate with the computing device 150. The secure storage device 115 may then utilize the selected key pair to authenticate future communications from the computing device 150. Additionally or alternatively, the secure storage device 115 may restrict access of the computing device 150 to a portion of the secure storage device 115 rather than the entire secure storage device 115. That is, the computing device 150 may access the data relevant to perform its respective function rather than all of the data. The secure storage device 115 implement the selection of the key pairs with additional computing device(s) 150 in the system 100 as well. For example, the secure storage device 115 may select a second key pair to associate with a second computing device 150.

By authenticating each computing device 150 with a different key pair, the security vulnerability of the system 100 may decrease. The increased quantity of key pairs may reduce the likelihood of an unauthorized party from obtaining access to the secure storage device 115.

Figure 2:
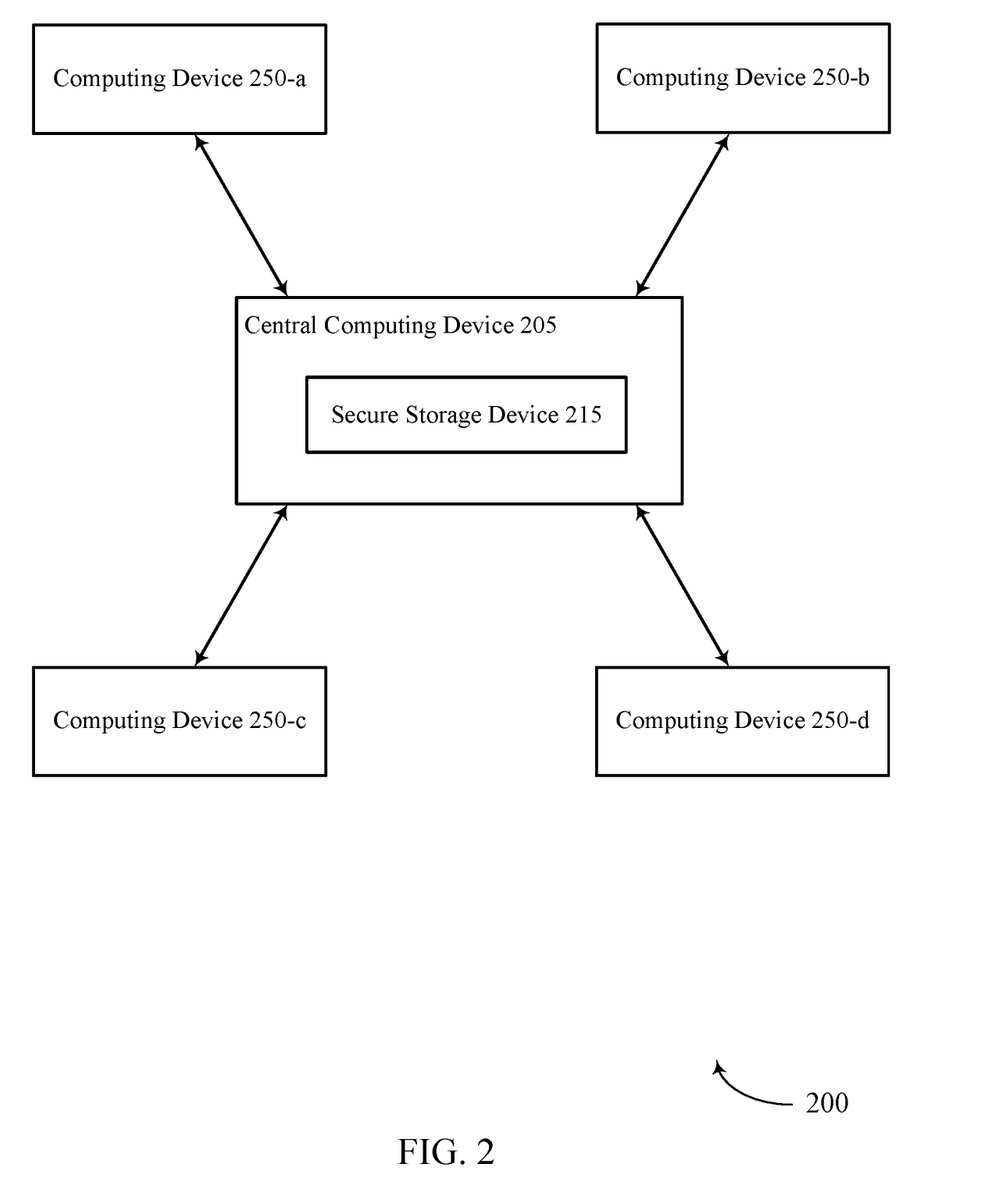
FIG. 2 illustrates an example of a system that supports secure storage device verification with multiple computing devices in accordance with examples as disclosed herein.

FIG. 2 illustrates an example of a system 200 that supports secure storage device verification with multiple computing devices in accordance with examples as disclosed herein. Central computing device 205 may be an example of a central computing device 105 as described with reference to FIG. 2. The secure storage device 215 may be an example of the secure storage device 115 or the secure component 130 as described with reference to FIG. 1. The system 200 may also include computing devices 250. Computing devices 250 may be examples of computing devices 150 as described with reference to FIG. 1. Four computing devices 250 are shown in FIG. 2 for illustrative purposes only. That is system 200 may also include more than or less than four computing devices 250.

The central computing device 205 may be the control unit of system 200. In other examples, the central computing device 205 may store data or information accessible by computing devices 250. That is, computing devices 250 may access information stored at the central computing device 205 to perform their respective functions or operations. The secure storage device 215 may store the information and data. Computing devices 250 may be examples of devices, services, processors, control units, servers, virtual machines or a combination thereof.

In some examples, system 200 may be an example of an automotive system. In such examples, the computing devices 250 may be examples of a power train control unit, a human-machine interface control unit, a door control unit, different types of engine control units, seat control unit, speed control unit, telematic control unit, transmission control unit, brake control unit, battery management control unit, entertainment control unit, or others, or a combination thereof. Additionally or alternatively, in such examples, the central computing device 205 may store the information used by the computing devices 250 at the secure storage device 215. That is, the secure storage device 215 may be an example of a consolidated storage device.

In some cases, the computing devices 250 may also include security procedures—e.g., authentication procedures. Such features may reduce the risk of an authorized party from gaining access to the computing device 250 or the information on the secure storage device 215. In some examples, when each computing device 250 has a separate security procedure, the system 200 may lack cohesiveness. That is, the system 200 may be unable to detect which computing devices 250 have been exploited and are compromised. In other examples, the central computing device 205 may manage the security procedures for the system 200. In such examples, the central computing device 205 may authenticate the computing devices 250 before sharing information and data. Such examples may simplify the safety procedures of the system 200 and enable the system 200 to be notified when a given computing device 250 is exploited.

In some examples, the central computing device 205 may authenticate the computing devices 250 with a single cryptographic key pair—e.g., a single public key and a single private key. When the central computing device 205 uses a single cryptographic key pair, the system 200 may have security vulnerabilities. For example, a computing device 250 may be compromised when an unauthorized party or unauthorized device accesses data or utilizes the operations or functionality of the computing device 250 by exploiting the single cryptographic key. In other examples, the system 200 as a whole may be compromised when a single computing device 250 is exploited. That is, an unauthorized party may obtain access to all of the data stored in the secure storage device 215 by obtaining the single cryptographic key pair.

As described herein, the secure storage device 215 may utilize multiple cryptographic key pairs to authenticate each central computing device 250 individually using an associated cryptographic key pair. For example, the secure storage device 215 may generate a predetermined quantity of cryptographic key pairs during an initialization procedure—e.g., when the system 200 is first powered. In some examples, the predetermined quantity generated may be based on the quantity of computing devices 250—e.g., four cryptographic key pairs may be generated when there are four computing devices 250. In some examples, the predetermined quantity generated may be based on a parameter for operating the secure storage device, a characteristic of the secure storage device, or a combination thereof. When computing device 250-a first communicates with the secure storage device 215, the secure storage device 215 may select a first cryptographic key pair from the quantity of cryptographic key pairs generated to associate with the computing device 250-a. The secure storage device 215 may then authenticate messages from computing device 250-a with the first cryptographic key pair. Additionally, the secure storage device 215 may also associate a second cryptographic key pair with computing device 250-b, a third cryptographic key pair with computing device 250-c, and a fourth cryptographic key pair with computing device 250-d. In examples where system 200 has additional computing devices 250, the secure storage device 215 may implement a similar process to associate additional cryptographic key pairs with the additional computing devices 250.

In some examples, when implementing multiple cryptographic key pairs, the secure storage device 215 may restrict the access of a computing device 250 to the information or data associated with the functions of the computing device 250. For example, the computing device 250-a may be a power train control unit. The secure storage device 215 may restrict the access of computing device 250-a to data and information associated with the power train control functions and operations. By implementing multiple cryptographic key pairs, system 200 may reduce security vulnerabilities. For example, even if a single computing device 250 is exploited, the access by the unauthorized party may remain limited—e.g., to only the data or information associated with the functions and operations of the exploited computing device 250. Additionally, the increased quantity of cryptographic key pairs may decrease the likelihood of an unauthorized party exploiting the entire system 200. Additional details of the authentication process are described below with reference to FIG. 3.

Figure 3:
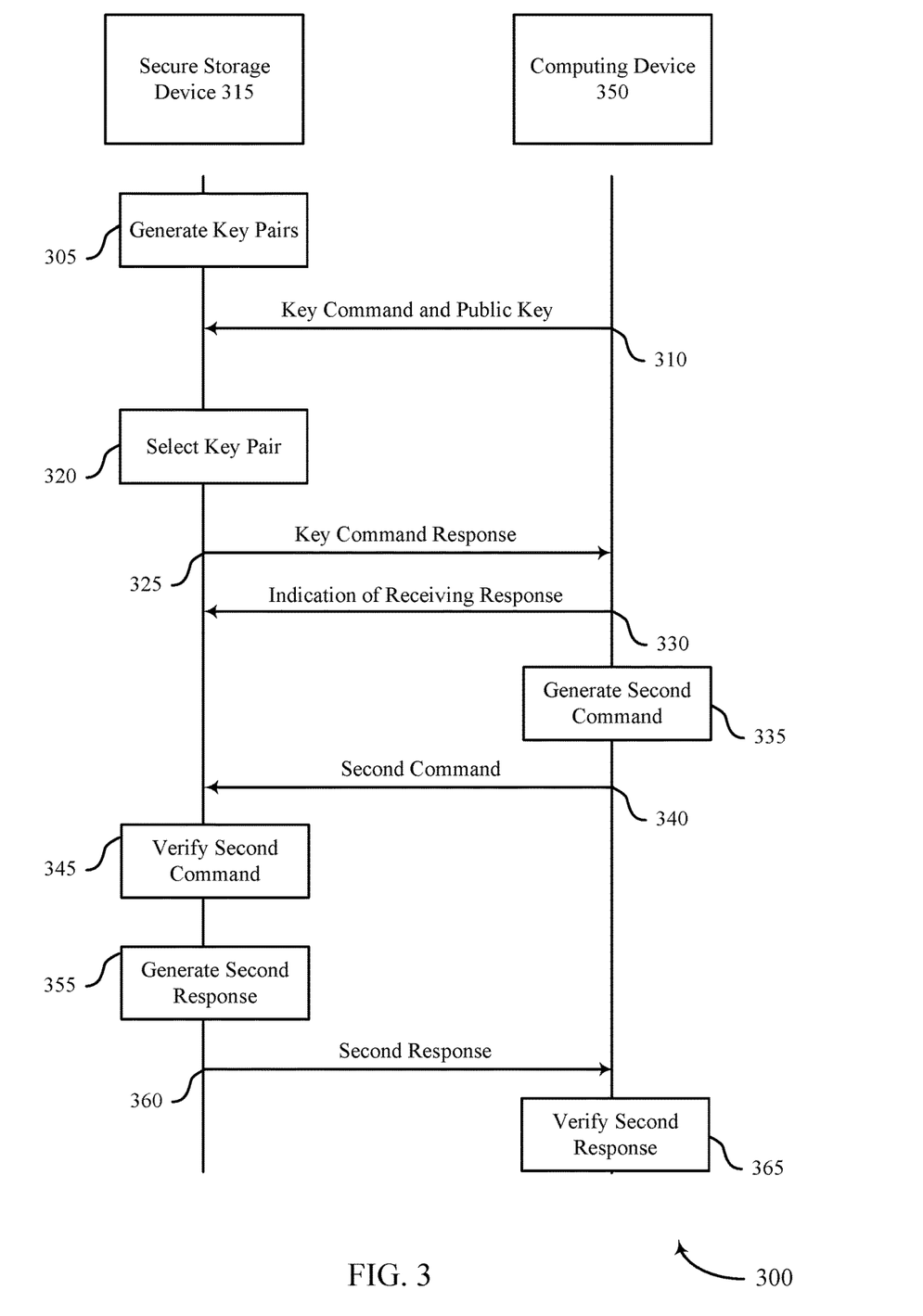
FIG. 3 illustrates an example of a flow diagram that supports secure storage device verification with multiple computing devices in accordance with examples as disclosed herein.

FIG. 3 illustrates an example of a flow diagram 300 that supports secure storage device verification with multiple computing devices in accordance with examples as disclosed herein. Flow diagram 300 may include secure storage device 315 and computing device 350, which may be respective examples of a secure storage device 115 or the secure component 130 and a computing device 350 as described with reference to FIG. 1. The secure storage device may be included in a central computing device—e.g., a central computing device 205 as described with reference to FIG. 2. Although shown in a particular sequence or order, unless otherwise specified, the order of the processes may be modified. Thus, the illustrated examples are used as examples, and the illustrated processes may be performed in a different order, and some processes may be performed in parallel. Additionally, one or more processes may be omitted in various examples. Thus, not all processes are used in every example. Other process flows are possible. The flow diagram 300 illustrates examples for generating and associating multiple cryptographic key pairs with individual computing devices 350.

At 305, the secure storage device 315 may generate a quantity of key pairs (e.g., cryptographic key pairs). In some examples, the secure storage device 315 may generate the quantity of key pairs by implementing a physical unclonable function (PUF). In such examples, the key pairs may be generated based on the physical characteristics of the secure storage device 315—e.g., based on the memory technology, like NAND or SRAM, of the secure storage device 315. Additionally, the secure storage device 315 may generate key pairs that include one public key and one private key (e.g., an RSA cryptosystem). The secure storage device 315 may share the public key generated and refrain from sharing the private key generated. In some examples, the secure storage device 315 may generate a predetermined quantity of key pairs based on the quantity of computing devices 350 included in a system (e.g., system 200 as described with reference to FIG. 2). In other examples, the secure storage device 315 may generate the key pairs during an initialization procedure—e.g., when the secure storage device 315 powers up for the first time.

At 310, the computing device 350 may transmit a request key command and its respective public key. In some examples, the computing device 350 may transmit a request key command the first time the computing device 350 communicates with the secure storage device 315. By transmitting the request key command, the computing device 350 may initiate the authentication procedure between the secure storage device 315 and the computing device 350. In addition to the request key command, the computing device 350 may also transmit a public key of a key pair (e.g., a first key pair) associated with the computing device 350. The secure storage device 315 may receive the request key command and the public key from the computing device 350.

At 320, the secure storage device 315 may select a key pair (e.g., a second key pair) from the quantity of key pairs generated. In some examples, the secure storage device 315 may select the key pair based on a sequential sequence of available key pairs—e.g., a first come first serve basis. For example, the secure storage device 315 may generate a first key pair first, then a second key pair, a third key pair and so forth. When selecting the key pairs, the secure storage device 315 may select the key pair based on the generation sequence—e.g., the first key pair first. In other examples, the secure storage device 315 may select the key pairs in a different order—e.g., randomly.

In some examples, after selecting the key pair, the secure storage device 315 may encrypt a public key of the key pair selected with the public key received from the computing device 350. Additionally or alternatively, the secure storage device 315 may also sign the request key command with a private key of the key pair selected at the secure storage device 315. For example, the secure storage device 315 may generate, using the private key of the key pair selected, a first value associated with the public key of the key pair selected. By encrypting the public key of the key pair selected and signing the command, the central computing device 350 may associate the selected key pair with the computing device 350. In some examples where the system has additional computing devices 350, the secure storage device 315 may implement a similar process to associate additional key pairs with the additional computing devices 350—e.g., selecting a second key pair to associate with a second computing device 350.

At 325, the secure storage device 315 may transmit to the computing device 350 the request key command response. For example, the secure storage device 315 may communicate the encrypted public key of the selected key pair along with the value generated from signing the request key command.

At 330, the computing device 350 may indicate the receipt of the request key command response. That is, the computing device 350 may indicate the receipt of the encrypted public key associated with the secure storage device 315 selected key pair.

At 335, the computing device may generate a second command. For example, the computing device 340 may generate a command to request information and data from the secure storage device included in the secure storage device 315. In some examples, the computing device 350 may sign the second command based on a private key of the key pair associated with the computing device 350. That is, the computing device 350 may generate a second value associated with its respective private key to sign the second command. In some examples, the computing device 350 may sign all commands transmitted to the secure storage device 315 with its respective private key after the initial authentication procedure.

At 340, the computing device 350 may transmit to the secure storage device 315. For example, the second command may include the second value generated associated with the private key of the computing device 350.

At 345, the secure storage device 315 may verify the second command received from the computing device 350. That is, the secure storage device 315 may authenticate that the second command received is from the computing device 350 rather than an unauthorized party. For example, the secure storage device 315 may authenticate the second command by utilizing the public key received from the computing device 350—e.g., the public key of the key pair associated with the computing device 350. That is, the secure storage device 315 may verify the second command as being from computing device 350 based on the public key received from the computing device 350—e.g., decrypt the second command using the public key received from the computing device 350. In some examples, the secure storage device 315 may verify all commands received from the computing device 350 with the received public key from the computing device 350.

At 355, the secure storage device 315 may generate a second response to the second command. That is, the secure storage device 315 may execute the second command and generate a response based on executing the response. For example, when the second command requests data or information, the secure storage device 315 may access the requested information. Additionally, the secure storage device 315 may sign the second response based on the private key of the selected key pair of the secure storage device 315. That is, the secure storage device 315 may generate a third value associated with its respective private key to sign the second response. In some examples, the secure storage device 315 may sign all responses transmitted to the computing device 350 with its respective private key after the initial authentication procedure.

At 360, the secure storage device 315 may transmit the second response to computing device 350. For example, the secure storage device 315 may transmit the second response including the third value generated and any information or data requested by the computing device 350.

At 365, the computing device 350 may verify the second response received from the secure storage device 315. That is, the computing device 350 may authenticate that the second response received is from the secure storage device 315 rather than an unauthorized party. For example, the computing device 350 may authenticate the second response by utilizing the public key received from the secure storage device 315—e.g., the public key of the selected key pair associated with the secure storage device 315. That is, the computing device 350 may verify the second command as being from the secure storage device 315 based on the public key received from the secure storage device 315—e.g., decrypt the second command using the public key received from the secure storage device 315. In some examples, the computing device 350 may verify all commands received from the secure storage device 315 with the received public key from the secure storage device 315.

Figure 4:
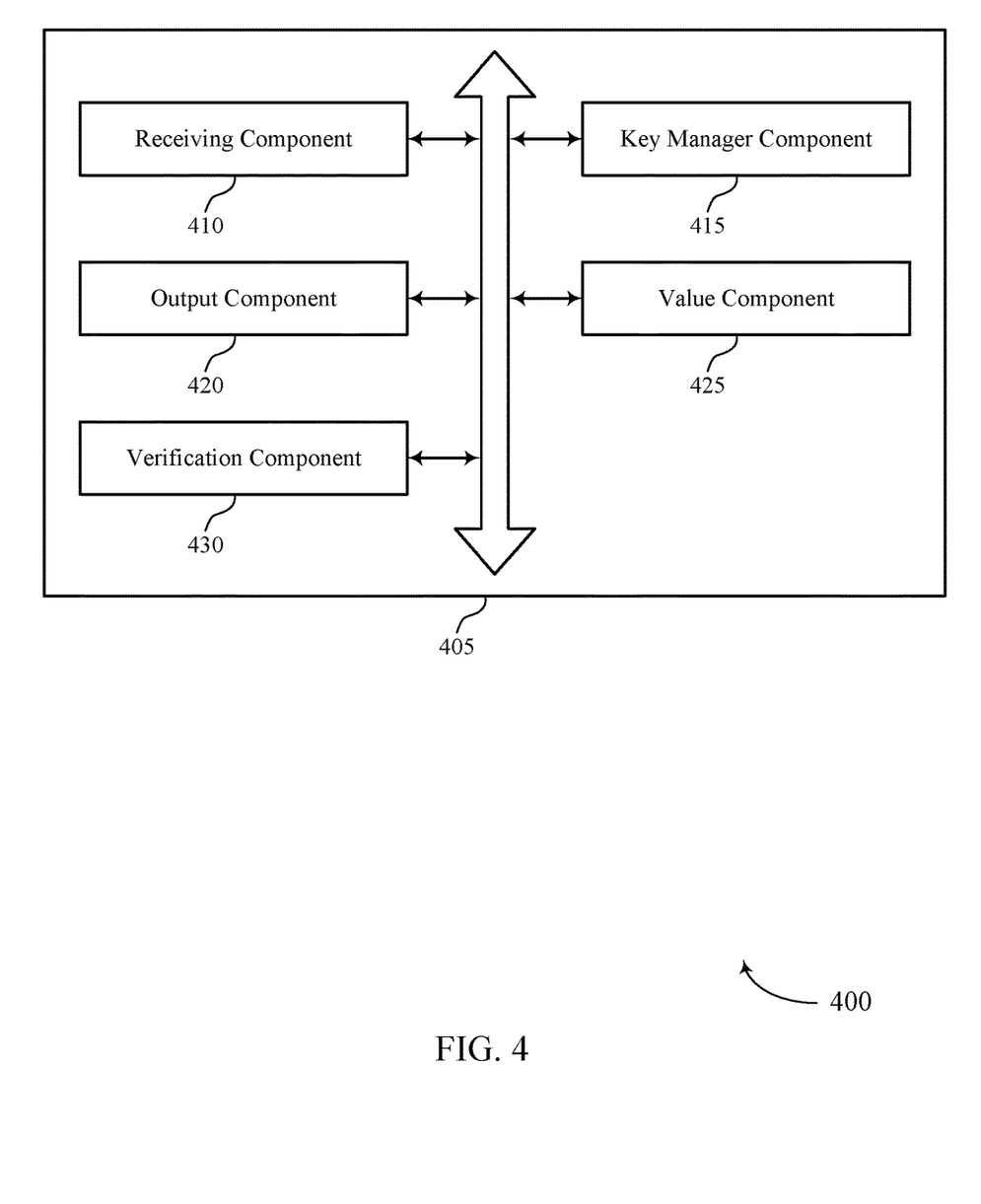
FIG. 4 shows a block diagram of a secure storage device that supports secure storage device verification with multiple computing devices in accordance with examples as disclosed herein.

FIG. 4 shows a block diagram 400 of a secure storage device 405 that supports secure storage device verification with multiple computing devices in accordance with examples as disclosed herein. The secure storage device 405 may be an example of aspects of a secure storage device as described with reference to FIGS. 1-3. The secure storage device 405 may include a receiving component 410, a key manager component 415, an output component 420, a value component 425, and a verification component 430. Each of these modules may communicate, directly or indirectly, with one another (e.g., via one or more buses).

The receiving component 410 may receive, at a secure storage device and from a computing device, a first command and a first public key of a first key pair associated with the computing device. In some examples, the receiving component 410 may receive, at the secure storage device and from a second computing device, a second command and a third public key of a third key pair associated with the second computing device. In some cases, the receiving component 410 may receive, at the secure storage device, a second command from the computing device after transmitting the message. In some instances, the receiving component 410 may receive, from the computing device, a second message indicating a receipt of the second public key at the computing device. In some examples, the receiving component 410 may receive, from the computing device, a second command after transmitting the message, where the second command is generated based on a first private key of the first key pair associated with the computing device.

The key manager component 415 may select a second key pair from a set of key pairs to associate with the computing device based on receiving the first command and the first public key. In some examples, the key manager component 415 may encrypt a second public key of the second key pair using the first public key based on selecting the second key pair. In some cases, the key manager component 415 may select a fourth key pair from the set of key pairs to associate with the second computing device based on receiving the second command and the third public key. In some instances, the key manager component 415 may encrypt a fourth public key of the fourth key pair using the third public key based on selecting the fourth key pair. In some examples, the key manager component 415 may select the fourth key pair is based on a sequential sequence of available key pairs from the set of key pairs. In some cases, the key manager component 415 may initialize the secure storage device before receiving the first command. In some instances, the key manager component 415 may generate the set of key pairs at the secure storage device based on initializing the secure storage device.

The output component 420 may transmit, to the computing device, a message that includes the encrypted second public key. In some examples, the output component 420 may transmit, to the second computing device, a second message that includes the encrypted fourth public key. In some cases, the output component 420 may transmit a second message to the computing device indicating an execution of the second command based on verifying the second command.

The value component 425 may generate, using a first private key of the second key pair, a value associated with the second public key of the second key pair, where the message transmitted to the computing device includes the value.

The verification component 430 may verify the second command as being from the computing device based on the first public key and the second key pair associated with the computing device.

In some examples, the computing device may have a similar verification component which may verify, at the computing device, the second message as being from the secure storage device based on the second public key associated with the secure storage device.

Figure 5:
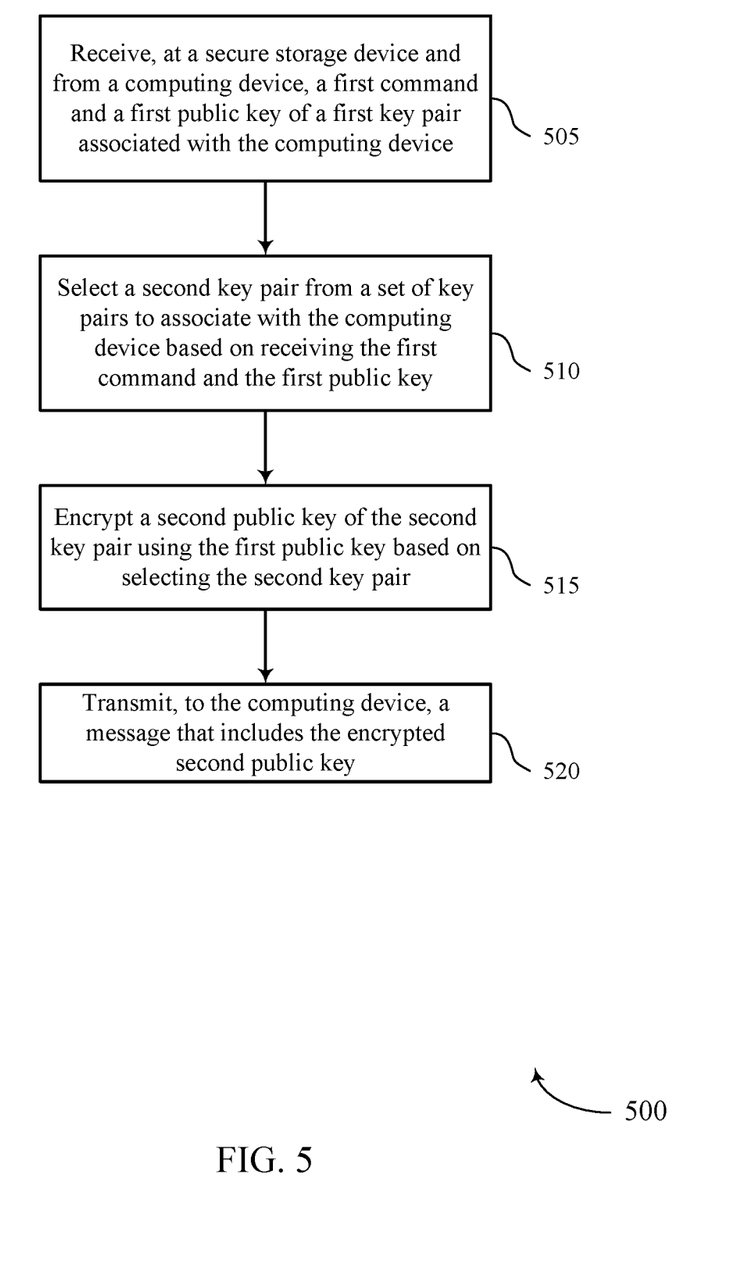
FIG. 5 shows a flowchart illustrating a method or methods that support secure storage device verification with multiple computing devices in accordance with examples as disclosed herein.

FIG. 5 shows a flowchart illustrating a method or methods 500 that supports secure storage device verification with multiple computing devices in accordance with examples as disclosed herein. The operations of method 500 may be implemented by a secure storage device or its components as described herein. For example, the operations of method 500 may be performed by a secure storage device as described with reference to FIG. 4. In some examples, a secure storage device may execute a set of instructions to control the functional elements of the secure storage device to perform the described functions. Additionally or alternatively, a secure storage device may perform aspects of the described functions using special-purpose hardware.

At 505, the secure storage device may receive, at a secure storage device and from a computing device, a first command and a first public key of a first key pair associated with the computing device. The operations of 505 may be performed according to the methods described herein. In some examples, aspects of the operations of 505 may be performed by a receiving component as described with reference to FIG. 4.

At 510, the secure storage device may select a second key pair from a set of key pairs to associate with the computing device based on receiving the first command and the first public key. The operations of 510 may be performed according to the methods described herein. In some examples, aspects of the operations of 510 may be performed by a key manager component as described with reference to FIG. 4.

At 515, the secure storage device may encrypt a second public key of the second key pair using the first public key based on selecting the second key pair. The operations of 515 may be performed according to the methods described herein. In some examples, aspects of the operations of 515 may be performed by a key manager component as described with reference to FIG. 4.

At 520, the secure storage device may transmit, to the computing device, a message that includes the encrypted second public key. The operations of 520 may be performed according to the methods described herein. In some examples, aspects of the operations of 520 may be performed by an output component as described with reference to FIG. 4.

In some examples, an apparatus as described herein may perform a method or methods, such as the method 500. The apparatus may include features, means, or instructions (e.g., a non-transitory computer-readable medium storing instructions executable by a processor) for receiving, at a secure storage device and from a computing device, a first command and a first public key of a first key pair associated with the computing device, selecting a second key pair from a set of key pairs to associate with the computing device based on receiving the first command and the first public key, encrypting a second public key of the second key pair using the first public key based on selecting the second key pair, and transmitting, to the computing device, a message that includes the encrypted second public key.

Some examples of the method 500 and the apparatus described herein may further include operations, features, means, or instructions for generating, using a first private key of the second key pair, a value associated with the second public key of the second key pair, where the message transmitted to the computing device includes the value.

Some examples of the method 500 and the apparatus described herein may further include operations, features, means, or instructions for receiving, at the secure storage device and from a second computing device, a second command and a third public key of a third key pair associated with the second computing device, selecting a fourth key pair from the set of key pairs to associate with the second computing device based on receiving the second command and the third public key, encrypting a fourth public key of the fourth key pair using the third public key based on selecting the fourth key pair, and transmitting, to the second computing device, a second message that includes the encrypted fourth public key.

Some examples of the method 500 and the apparatus described herein may further include operations, features, means, or instructions for selecting the fourth key pair may be based on a sequential sequence of available key pairs from the set of key pairs.

Some examples of the method 500 and the apparatus described herein may further include operations, features, means, or instructions for receiving, at the secure storage device, a second command from the computing device after transmitting the message, verifying the second command as being from the computing device based on the first public key and the second key pair associated with the computing device, and transmitting a second message to the computing device indicating an execution of the second command based on verifying the second command.

Some examples of the method 500 and the apparatus described herein may further include operations, features, means, or instructions for verifying, at the computing device, the second message as being from the secure storage device based on the second public key associated with the secure storage device.

Some examples of the method 500 and the apparatus described herein may further include operations, features, means, or instructions for initializing the secure storage device before receiving the first command, and generating the set of key pairs at the secure storage device based on initializing the secure storage device.

Some examples of the method 500 and the apparatus described herein may further include operations, features, means, or instructions for receiving, from the computing device, a second message indicating a receipt of the second public key at the computing device.

Some examples of the method 500 and the apparatus described herein may further include operations, features, means, or instructions for receiving, from the computing device, a second command after transmitting the message, where the second command may be generated based on a first private key of the first key pair associated with the computing device.

It should be noted that the methods described herein describe possible implementations, and that the operations and the steps may be rearranged or otherwise modified and that other implementations are possible. Further, portions from two or more of the methods may be combined.

An apparatus is described. The apparatus may include a secure storage device including a memory array, a controller coupled with the memory array and configured to cause the apparatus to, select a second key pair from a set of key pairs to associate with the computing device based on receiving the first command and the first public key, encrypt a second public key of the second key pair using the first public key based on selecting the second key pair, and transmit, to the computing device, a message that includes the encrypted second public key.

In some cases, the controller may be further configured to generate, using a first private key of the second key pair, a value associated with the second public key of the second key pair, where the message transmitted to the computing device includes the value.

In some examples, the controller may be further configured to receive, from a second computing device, a second command and a third public key of a third key pair associated with the second computing device, select a fourth key pair from the set of key pairs to associate with the second computing device based on receiving the second command and the third public key, encrypt a fourth public key of the fourth key pair using the third public key based on selecting the fourth key pair, and transmit, to the second computing device, a second message that includes the encrypted fourth public key.

In some examples, the controller may be configured to select the fourth key pair based on a sequential sequence of available key pairs from the set of key pairs.

In some instances, the controller may be further configured to receive a second command from the computing device after transmitting the message, verify the second command as being from the computing device based on the first public key and the second key pair associated with the computing device, and transmit a second message to the computing device indicating an execution of the second command based on verifying the second command.

In some cases, the controller may be further configured to initialize the secure storage device before receiving the first command, and generate the set of key pairs at the secure storage device based on initializing the secure storage device.

In some cases, the controller may be further configured to receive, from the computing device, a second message indicating a receipt of the second public key at the computing device.

In some instances, the controller may be further configured to receive, from the computing device, a second command after transmitting the message, where the second command may be generated based on a first private key of the first key pair associated with the computing device.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
    receiving, at a secure storage device and from a computing device, a first command and a first public key of a first key pair associated with the computing device;
    selecting a second key pair from a plurality of key pairs to associate with the computing device based at least in part on receiving the first command and the first public key;
    encrypting a second public key of the second key pair using the first public key based at least in part on selecting the second key pair;
    transmitting, to the computing device, a first message that includes the encrypted second public key;
    receiving, at the secure storage device, a second command from the computing device after transmitting the first message;
    verifying the second command as being from the computing device based at least in part on the first public key and the second key pair associated with the computing device; and
    transmitting a second message to the computing device indicating an execution of the second command based at least in part on verifying the second command.

2. The method of claim 1, further comprising:
    generating, using a private key of the second key pair, a value associated with the second public key of the second key pair, wherein the first message transmitted to the computing device includes the value.

3. The method of claim 1, further comprising:
    receiving, at the secure storage device and from a second computing device, a third command and a third public key of a third key pair associated with the second computing device;

selecting a fourth key pair from the plurality of key pairs to associate with the second computing device based at least in part on receiving the third command and the third public key;

encrypting a fourth public key of the fourth key pair using the third public key based at least in part on selecting the fourth key pair; and transmitting, to the second computing device, a third message that includes the encrypted fourth public key.

4. The method of claim 3, wherein:

selecting the fourth key pair is based on a sequential sequence of available key pairs from the plurality of key pairs.

5. The method of claim 1, further comprising:

verifying, at the computing device, the second message as being from the secure storage device based at least in part on the second public key associated with the secure storage device.

6. The method of claim 1, further comprising:

initializing the secure storage device before receiving the first command; and generating the plurality of key pairs at the secure storage device based at least in part on initializing the secure storage device.

7. The method of claim 1, further comprising:

receiving, from the computing device, a third message indicating a receipt of the second public key at the computing device.

8. The method of claim 1, further comprising:

receiving, from the computing device, a third command after transmitting the first message, wherein the third command is generated based at least in part on a private key of the first key pair associated with the computing device.

9. An apparatus, comprising:

a secure storage device comprising a memory array; and a controller coupled with the memory array and configured to cause the apparatus to:

receive, from a computing device, a first command and a first public key of a first key pair associated with the computing device;

select a second key pair from a plurality of key pairs to associate with the computing device based at least in part on receiving the first command and the first public key;

encrypt a second public key of the second key pair using the first public key based at least in part on selecting the second key pair;

transmit, to the computing device, a first message that includes the encrypted second public key;

receive a second command from the computing device after transmitting the first message;

verify the second command as being from the computing device based at least in part on the first public key and the second key pair associated with the computing device; and transmit a second message to the computing device indicating an execution of the second command based at least in part on verifying the second command.

10. The apparatus of claim 9, wherein the controller is further configured to:

generate, using a private key of the second key pair, a value associated with the second public key of the second key pair, wherein the first message transmitted to the computing device includes the value.

11. The apparatus of claim 9, wherein the controller is further configured to:

receive, from a second computing device, a third command and a third public key of a third key pair associated with the second computing device;

select a fourth key pair from the plurality of key pairs to associate with the second computing device based at least in part on receiving the third command and the third public key;

encrypt a fourth public key of the fourth key pair using the third public key based at least in part on selecting the fourth key pair; and transmit, to the second computing device, a third message that includes the encrypted fourth public key.

12. The apparatus of claim 11, wherein the controller is configured to select the fourth key pair based on a sequential sequence of available key pairs from the plurality of key pairs.

13. The apparatus of claim 9, wherein the controller is further configured to:

initialize the secure storage device before receiving the first command; and generate the plurality of key pairs at the secure storage device based at least in part on initializing the secure storage device.

14. The apparatus of claim 9, wherein the controller is further configured to:

receive, from the computing device, a third message indicating a receipt of the second public key at the computing device.

15. The apparatus of claim 9, wherein the controller is further configured to:

receive, from the computing device, a third command after transmitting the first message, wherein the third command is generated based at least in part on a private key of the first key pair associated with the computing device.

16. A non-transitory computer-readable medium storing code comprising instructions, which when executed by a processor of an electronic device, cause the electronic device to:

receive, at a secure storage device and from a computing device, a first command and a first public key of a first key pair associated with the computing device;

select a second key pair from a plurality of key pairs to associate with the computing device based at least in part on receiving the first command and the first public key;

encrypt a second public key of the second key pair using the first public key based at least in part on selecting the second key pair;

transmit, to the computing device, a first message that includes the encrypted second public key;

receive, at the secure storage device, a second command from the computing device after transmitting the first message;

verify the second command as being from the computing device based at least in part on the first public key and the second key pair associated with the computing device; and transmit a second message to the computing device indicating an execution of the second command based at least in part on verifying the second command.

17. The non-transitory computer-readable medium of claim 16, wherein the instructions, when executed by the processor the electronic device, further cause the electronic device to:

generate, using a private key of the second key pair, a value associated with the second public key of the second key pair, wherein the first message transmitted to the computing device includes the value.

18. The non-transitory computer-readable medium of claim 16, wherein the instructions, when executed by the processor the electronic device, further cause the electronic device to:
receive, at the secure storage device and from a second computing device, a third command and a third public key of a third key pair associated with the second computing device;
select a fourth key pair from the plurality of key pairs to associate with the second computing device based at least in part on receiving the third command and the third public key;
encrypt a fourth public key of the fourth key pair using the third public key based at least in part on selecting the fourth key pair; and
transmit, to the second computing device, a third message that includes the encrypted fourth public key.

19. The non-transitory computer-readable medium of claim 18, wherein the instructions, when executed by the processor the electronic device, further cause the electronic device to select the fourth key pair based on a sequential sequence of available key pairs from the plurality of key pairs.

20. The non-transitory computer-readable medium of claim 16, wherein the instructions, when executed by the processor the electronic device, further cause the electronic device to:
initialize the secure storage device before receiving the first command; and
generate the plurality of key pairs at the secure storage device based at least in part on initializing the secure storage device.

21. The non-transitory computer-readable medium of claim 16, wherein the instructions, when executed by the processor the electronic device, further cause the electronic device to:
receive, from the computing device, a third message indicating a receipt of the second public key at the computing device.

22. The non-transitory computer-readable medium of claim 16, wherein the instructions, when executed by the processor the electronic device, further cause the electronic device to:
receive, from the computing device, a third command after transmitting the first message, wherein the third command is generated based at least in part on a private key of the first key pair associated with the computing device.

* * * * *